(12) United States Patent
Taniyama et al.

(10) Patent No.: US 11,917,285 B2
(45) Date of Patent: *Feb. 27, 2024

(54) RECORDING CONTROL APPARATUS, RECORDING APPARATUS, RECORDING CONTROL METHOD, AND RECORDING CONTROL PROGRAM

(71) Applicant: JVCKENWOOD Corporation, Yokohama (JP)

(72) Inventors: Hirofumi Taniyama, Yokohama (JP); Yasutoshi Sakai, Yokohama (JP); Keita Hayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 240 days.

This patent is subject to a terminal disclaimer.

(21) Appl. No.: 17/526,851

(22) Filed: Nov. 15, 2021

(65) Prior Publication Data

US 2022/0078355 A1 Mar. 10, 2022

Related U.S. Application Data

(63) Continuation of application No. PCT/JP2020/017320, filed on Apr. 22, 2020.

(30) Foreign Application Priority Data

Jun. 27, 2019 (JP) ................ 2019-119561

(51) Int. Cl.
*H04N 23/63* (2023.01)
*G06V 20/40* (2022.01)
*G01S 19/42* (2010.01)

(52) U.S. Cl.
CPC .......... *H04N 23/632* (2023.01); *G01S 19/42* (2013.01); *G06V 20/40* (2022.01); *G06V 20/44* (2022.01)

(58) Field of Classification Search
None
See application file for complete search history.

(56) References Cited

U.S. PATENT DOCUMENTS

2009/0309987 A1 12/2009 Kimura et al.
2010/0171829 A1 7/2010 Yago et al.
(Continued)

FOREIGN PATENT DOCUMENTS

CN 101772786 A 7/2010
CN 202713439 U 1/2013
(Continued)

OTHER PUBLICATIONS

Office Action in related U.S. Appl. No. 17/833,359, dated May 19, 2023.

(Continued)

*Primary Examiner* — Mark T Monk
(74) *Attorney, Agent, or Firm* — Procopio, Cory, Hargreaves & Savitch LLP

(57) ABSTRACT

A recording control apparatus includes a recording control unit for storing photographing data corresponding to an event of a mobile object as event record data in a recording unit, a removal detection unit for detecting that a recording apparatus is removed from the mobile object by acquiring a signal indicating that the recording apparatus including at least the recording unit is removed from the mobile object, a location information acquisition unit for acquiring location information of the recording apparatus, and a communication control unit for transmitting the location information acquired by the location information acquisition unit to another apparatus when the removal of the recording apparatus is detected by the removal detection unit within a predetermined time period after the event detection unit detects the event.

8 Claims, 7 Drawing Sheets

(56) References Cited

U.S. PATENT DOCUMENTS

| | | | |
|---|---|---|---|
| 2010/0201819 | A1 | 8/2010 | Minowa |
| 2013/0135509 | A1 | 5/2013 | Fuji |
| 2016/0155004 | A1 | 6/2016 | Shiraishi et al. |
| 2019/0130664 | A1* | 5/2019 | Appel ................... G06N 20/00 |
| 2019/0259227 | A1 | 8/2019 | Oesterling et al. |
| 2022/0301368 | A1* | 9/2022 | Taniyama ................ H04N 7/18 |

FOREIGN PATENT DOCUMENTS

| | | |
|---|---|---|
| CN | 207489115 U | 6/2018 |
| EP | 20134080 A2 | 12/2009 |
| JP | 2009087007 A | 4/2009 |
| JP | 2017-049683 A | 3/2017 |
| JP | 2019032725 A | 2/2019 |
| KR | 2011-0042513 A | 4/2011 |
| KR | 20110041626 A | 4/2011 |

OTHER PUBLICATIONS

Office Action in related U.S. Appl. No. 17/833,359, dated Aug. 17, 2023.
Notice of Allowance in related U.S. Appl. No. 17/833,359, dated Oct. 27, 2023.

* cited by examiner

RECORDING CONTROL APPARATUS, RECORDING APPARATUS, RECORDING CONTROL METHOD, AND RECORDING CONTROL PROGRAM

CROSS REFERENCE TO RELATED APPLICATION

The present application is based upon and claims the benefit of priority from Japanese Patent Application No. 2019-119561, filed on Jun. 27, 2019, the disclosure of which are incorporated herein in its entirety by reference.

BACKGROUND

The present disclosure relates to a recording control apparatus, a recording apparatus, a recording control method, and a recording control program.

A widely-used dashboard camera includes means for acquiring data such as images by photographing a scene of an event around a vehicle and means for detecting that the vehicle has received some kind of impact, and stores the images and the like for a predetermined time period in a reproducible manner based on a time point when the impact on the vehicle is detected. For example, Japanese Unexamined Patent Application Publication No. 2009-087007 discloses a dashboard camera for recording image data based on a transition of acceleration. Such a dashboard camera, when it detects an event caused by an accident or the like, stores photographing data obtained by photographing a scene of the accident or the like in a reproducible manner. When abnormal acceleration is detected due to dangerous driving or the like, the dashboard camera stores the state of the dangerous driving in a reproducible manner.

SUMMARY

In the event of an accident, parties of the accident or the parties and the police may reproduce event record data stored by a dashboard camera to check a circumstance of the accident.

However, before or at the time of checking the circumstance of the accident, there is a possibility that one malicious party may steal and take away the dashboard camera of the other party in order to destroy the event record data (evidence) in which the circumstance of the accident is recorded, or dispose of the dashboard camera while escaping. In such cases, it may be difficult to identify the escaping party.

The present disclosure is made to solve such a problem, and an object of the present disclosure is to provide a recording control apparatus, a recording apparatus, a recording control method, and a recording control program, which can provide information for enabling identification of a party who has taken away the recording apparatus when the recording apparatus has been taken away after an event such as an accident has occurred.

A first example aspect of the present disclosure is a recording control apparatus including:
a photographing data acquisition unit configured to acquire photographing data photographed by a photographing unit;
an event detection unit configured to detect an event of a mobile object;
a recording control unit configured to store the photographing data for a predetermined time period corresponding to the event detected by the event detection unit as event record data in a recording unit;
a removal detection unit configured to detect that the recording apparatus is removed from the mobile object by acquiring a signal indicating that the recording apparatus including at least the recording unit is removed from the mobile object;
a location information acquisition unit configured to acquire location information of the recording apparatus; and
a communication control unit configured to transmit the location information acquired by the location information acquisition unit to another apparatus when the removal of the recording apparatus is detected by the removal detection unit within a predetermined time period after the event detection unit detects the event.

A second example aspect of the present disclosure is a recording apparatus including:
the above recording control apparatus;
the photographing unit;
a display unit configured to display the photographing data photographed by the photographing unit;
the recording unit;
a GNSS reception unit configured to output a GNSS reception signal to the location information acquisition unit; and
an internal power supply configured to supply power to the recording apparatus.

A third example aspect of the present disclosure is a recording control method including:
acquiring photographing data photographed by a photographing unit;
detecting an event of a mobile object;
storing the photographing data for a predetermined time period corresponding to the detected event as event record data in a recording unit;
detecting that a recording apparatus is removed from the mobile object by acquiring a signal indicating that the recording apparatus including at least the recording unit is removed from the mobile object;
acquiring location information of the recording apparatus; and
transmitting the acquired location information to another apparatus when the removal of the recording apparatus is detected within a predetermined time period after the event is detected.

A fourth example aspect of the present disclosure is a recording control program for causing a computer to execute processing of:
acquiring photographing data photographed by a photographing unit;
detecting an event of a mobile object;
storing the photographing data for a predetermined time period corresponding to the detected event as event record data in a recording unit;
detecting that a recording apparatus is removed from the mobile object by acquiring a signal indicating that the recording apparatus including at least the recording unit is removed from the mobile object;
acquiring location information of the recording apparatus; and
transmitting the acquired location information to another apparatus when the removal of the recording apparatus is detected within a predetermined time period after the event is detected.

According to this embodiment, it is possible to provide a recording control apparatus, a recording apparatus, a recording control method, and a recording control program, which can provide information for enabling identification of a party who has taken away the recording apparatus when the recording apparatus has been taken away after an event such as an accident has occurred.

DETAILED DESCRIPTION

Specific embodiments to which the present disclosure is applied will be described in detail below with reference to the drawings. However, the present disclosure is not limited to the following embodiments. For clarity of description, the following description and drawings have been simplified as appropriate.

A configuration of the embodiment will be described below with reference to the drawings. A recording apparatus 10 according to this embodiment is used in a mobile object such as an automobile and controls recording of photographing data photographed by a photographing unit such as a camera, and is, for example, an apparatus called a dashboard camera. A recording control apparatus 100, which is a control unit of the recording apparatus 10, has a function of storing the photographing data for a preset time period as "event record data" using, for example, acceleration due to an impact applied to the mobile object, such as an unexpected impact due to a collision accident, as a trigger. By reproducing the event record data using the recording apparatus 10 or another reproducing apparatus and viewing images of the reproduced event record data, a driver of the automobile or the like can understand a circumstance of the event. When the recording apparatus 10 is provided with a reproducing function of the event record data or the like, the recording apparatus 10 may be referred to as a recording and reproducing apparatus. Note that the mobile object is not limited to a vehicle, and instead may be a person or an animal in addition to, for example, a motorcycle, a drone, an airplane, or a ship. Hereinafter, the vehicle will be described as an example of the mobile object.

First Embodiment

Figure 1:
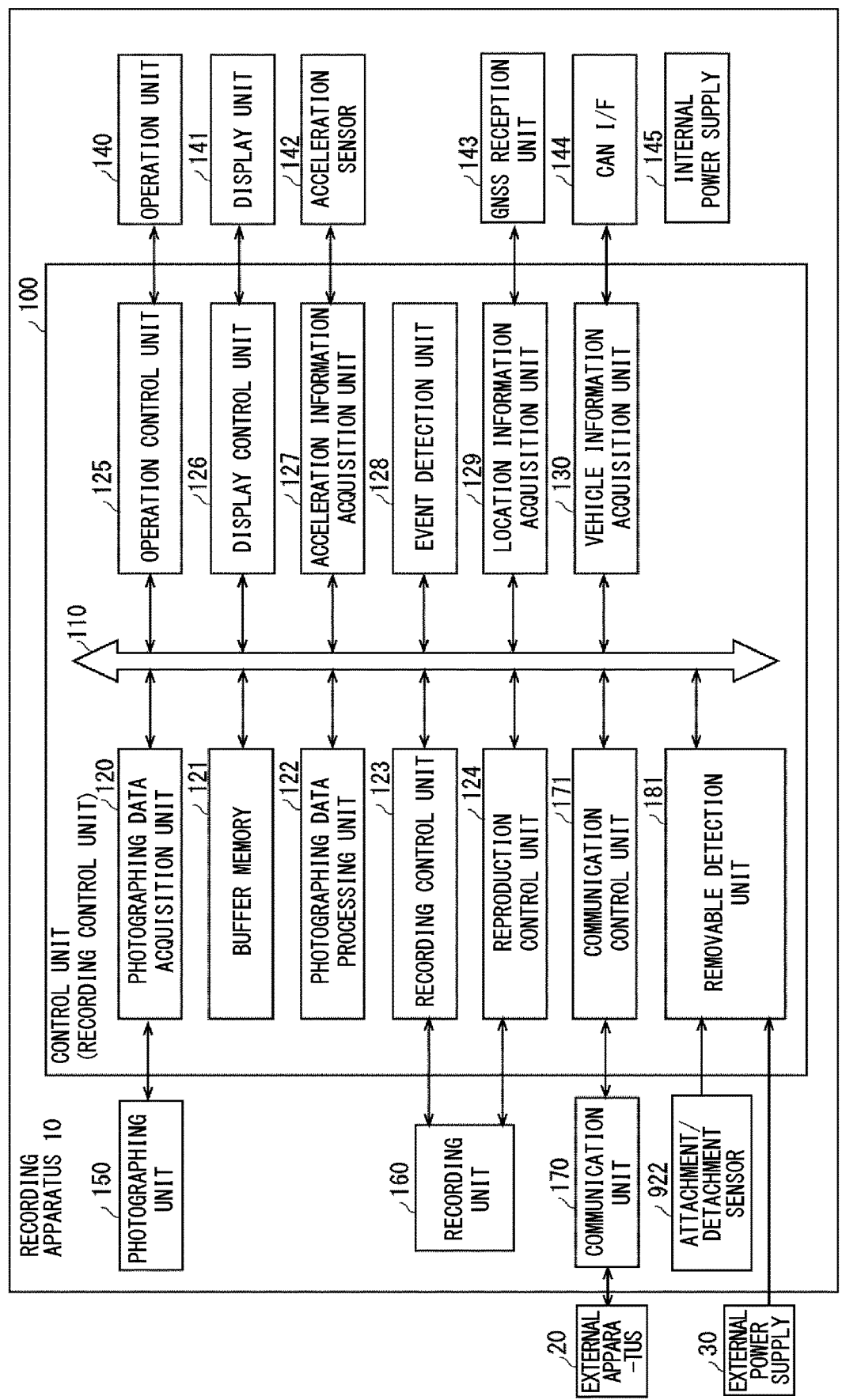
FIG. 1 is a block diagram showing a configuration of a recording apparatus according to a first embodiment.

FIG. 1 is a block diagram showing a configuration of the recording apparatus 10 including the recording control apparatus 100 according to the first embodiment. As shown in FIG. 1, the recording apparatus 10 includes a plurality of components connected to a control unit (also referred to herein as a recording control apparatus) 100 and the control unit 100 for controlling each component. The control unit 100 is a control apparatus having a circuit board on which a CPU (Central Processing Unit), a GPU (Graphics Processing Unit), a memory, a plurality of interfaces, etc., are mounted. The control unit 100 executes stored programs to thereby execute various processes.

The control unit 100 according to this embodiment will be described in detail below with reference to FIG. 1. The control unit 100 also functions as a functional computing unit for executing each of the subdivided processes. Specifically, the control unit 100 may include a photographing data acquisition unit 120, a buffer memory 121, a photographing data processing unit 122, a recording control unit 123, a reproduction control unit 124, an operation control unit 125, a display control unit 126, an acceleration information acquisition unit 127, an event detection unit 128, a location information acquisition unit 129, a vehicle information acquisition unit 130, a communication control unit 171, and a removal detection unit 181. In FIG. 1, for convenience, each of these components is shown as being connected to a bus line 110.

The photographing data acquisition unit 120 acquires the photographing data supplied from the photographing unit 150 such as a camera. The photographing data acquisition unit 120 supplies the photographing data to the buffer memory 121 through the bus line 110.

The buffer memory 121 is a volatile or non-volatile memory apparatus. The buffer memory 121 sequentially receives the photographing data periodically generated by the photographing unit 150 through the photographing data acquisition unit 120, and temporarily stores the received photographing data.

The photographing data processing unit 122 generates a photographing file of a format conforming to a predetermined preset format for a fixed period from the photographing data stored in the buffer memory 121. The preset format is, for example, H. 264 and MPEG-4 (Moving Picture Experts Group), and the period for which the photographing file is generated is, for example, 60 seconds, but the present disclosure not limited to them.

The photographing data processing unit 122 may process the photographing data to generate the photographing file having a preset angle of view. The photographing data processing unit 122 may perform various processes on the photographing data output from the buffer memory 121, generate the photographing data of a preset time or a preset angle of view, and add header information such as a file name to generate the photographing file. Further, the photographing data processing unit 122 may process the photographing data output from the buffer memory 121 to perform noise removal, distortion correction, and the like on the photographing data, or may generate the photographing file which displays time information, vehicle velocity information, vehicle location information, etc. in the photographing data.

The recording control unit 123 controls the recording unit 160 to record the photographing file generated by the photographing data processing unit 122. When the event detection unit 128 detects an event, the recording control unit 123 stores the photographing file for a predetermined time period preset based on the detection of the event in the recording unit 160 as the event record data which is prohibited from being overwritten. Such a photographing operation is referred to as an event record operation. The photographing file for the predetermined time period preset based on the detection of the event is, for example, the photographing file for 30 seconds before and after the time when the event is detected. The recording control unit 123 can store the event record data in a predetermined recording area in the recording unit 160. The predetermined recording area is, for example, a recording area in which overwriting or erasure is prohibited. Alternatively, a flag indicating that overwriting or erasure is prohibited may be added to a file of the event record data supplied to the recording unit 160 by the recording control unit 123 and then the file may be stored.

The recording control unit 123 records, in the recording unit 160, information indicating whether or not the event record data stored in the recording unit 160 has been reproduced by the reproduction control unit 124 in the past. By doing so, the reproduction control unit 124 can identify which event record data is not reproduced.

If the event detection unit 128 has not detected an event, the recording control unit 123 may store the photographing file in the recording unit 160 in a state in which the photographing file can be overwritten. The photographing file stored in the recording unit 160 and different from the event record data is referred to herein as a "normal file". When a storage capacity of the recording unit 160 reaches an upper limit, the recording control unit 123 may delete the old normal file and record the newly generated normal file in the recording unit 160. Such a photographing operation is referred to as a loop recording operation.

The recording control unit 123 records, in the recording unit 160, information indicating whether or not the event record data stored in the recording unit 160 has been reproduced by the reproduction control unit 124 in the past. By doing so, the reproduction control unit 124 can identify which event record data is not reproduced.

The operation control unit 125 acquires operation information received by the operation unit 140, and outputs an operation instruction based on the operation information to each component. When the operation control unit 125 obtains an instruction to select various data to be reproduced from the operation unit 140, the operation control unit 125 controls the reproduction control unit 124 to select a file or the like recorded in the recording unit 160. When the operation control unit 125 obtains an instruction regarding the reproduction of various data from the operation unit 140, the operation control unit 125 controls the reproduction control unit 124 to perform processing related to the reproduction. The instructions related to the reproduction of the various data are, for example, reproduction start, pause, reproduction stop, enlarged display, etc.

The display control unit 126 controls the display unit 141 to display various information. For example, the display control unit 126 controls the display unit 141 to display the photographing data which is being photographed by the photographing unit 150. The display control unit 126 receives the event record data supplied from the reproduction control unit 124, and displays the received event record data on the display unit 141. When a touch sensor is superimposed on the display unit 141 as a function of the operation unit 140, the display control unit 126 controls the display unit 141 to appropriately display an icon corresponding to the touch sensor.

The acceleration information acquisition unit 127 receives information about acceleration detected by the acceleration sensor 142 mounted on the recording apparatus 10 and outputs it to the acceleration information acquisition unit 127.

The event detection unit 128 detects an occurrence of the event of the mobile object from a magnitude of a signal and a signal pattern of the received information based on the information about the acceleration acquired from the acceleration information acquisition unit 127. The acceleration detected as the event of the mobile object is, for example, acceleration generated by an impact generated when the vehicle as the mobile object collides with another object.

When the event detection unit 128 detects that the information received from the acceleration information acquisition unit 127 corresponds to an occurrence of a predetermined event, it supplies a signal indicating that the occurrence of the event is detected to the recording control unit 123. An event is considered to have occured, for example, when acceleration generated due to an accident in which an object collides with a vehicle is detected. For example, when acceleration exceeding a preset magnitude in a preset direction is detected beyond a preset time period, or when a change in the acceleration is large in a preset time period, the event detection unit 128 detects the occurrence of the event. The event detection unit 128 may detect the acceleration in the X, Y, and Z axes, which are coordinate axes of the 3-axis coordinates, or may detect the acceleration in at least one of these axial directions. The acceleration received from these three axial directions may be weighted.

The acceleration information acquisition unit 127 may acquire the information about the acceleration from an acceleration sensor (not shown) mounted on the mobile object such as a vehicle, instead of the acceleration sensor 142 mounted on the recording apparatus 10.

The location information acquisition unit 129 receives a GNSS (Global Navigation Satellite System) reception signal from a GNSS satellite received by the GNSS reception unit 143, calculates the location information that is information about a current location from the received signal, and supplies the calculated location information to the recording control unit 123 and the communication control unit 171. The location information includes, for example, the latitude and longitude of the vehicle at the time when the signal is received from the GNSS satellite. The location information acquisition unit 129 can acquire the location information of the vehicle at the time when the vehicle stops after an occurrence of an event such as an accident based on the vehicle information from the vehicle information acquisition unit 130 described later.

The vehicle information acquisition unit 130 acquires vehicle information related to a vehicle, for example, from an ECU (Electronic Control Unit) (not shown) connected through a CAN (Controller Area Network) interface (I/F) 144. The vehicle information includes, for example, vehicle velocity information and braking information. The vehicle information acquisition unit 130 may acquire the location information of the vehicle based on a GNSS reception unit (not shown) mounted on the vehicle.

The removal detection unit 181 detects removal of the recording apparatus 10 from the vehicle by receiving a signal indicating the removal of the recording apparatus 10 from the vehicle. The recording apparatus 10 is connected to a power supply (an external power supply of the vehicle through a wired cable. When the wired cable is unplugged, the removal detection unit 181 acquires a signal indicating that the external power supply 30 is disconnected. That is, the removal detection unit 181 may detect the removal from the vehicle based on the signal indicating that the external power supply 30 supplied from the vehicle to the recording apparatus 10 is disconnected.

Alternatively, the removal detection unit 181 may receive a signal indicating that the recording apparatus 10 is removed from the vehicle from an attachment/detachment sensor 922 (described later in FIG. 2) provided in an attachment/detachment unit 921 of the recording apparatus 10.

Further, the removal detection unit 181 may determine that the recording apparatus 10 is removed from the vehicle when a distance indicated by the location information of the recording apparatus 10 acquired by the location information acquisition unit 129 provided in the recording apparatus 10 and a location at which the vehicle has stopped acquired by the vehicle information acquisition unit 130 is equal to or greater than a first predetermined distance. The first predetermined distance may be set to any distance, for example, 2 m to 5 m, where a main body of the recording apparatus 10 is considered to have been removed from the vehicle.

When the removal detection unit 181 detects the removal of the recording apparatus 10 within a predetermined time period after the event detection unit 128 detects the event, the communication control unit 171 transmits the location information of the recording apparatus acquired by the location information acquisition unit 129 to an external apparatus 20 which is another apparatus. Alternatively, the communication control unit 171 may transmit the location information of the recording apparatus 10 to the external apparatus 20 when the removal detection unit 181 detects the removal of the recording apparatus 10 within a predetermined time period after the recording control unit 123 stores the event record data. The location information to be transmitted to the external apparatus 20 also includes time information corresponding to the location. The external apparatus 20 of a transmission destination can be set in advance by an owner of the recording apparatus 10. An example of the external apparatus 20 may be a mobile phone, a smartphone, or a computer of the owner of the recording apparatus 10, or a server in the cloud. The external apparatus 20 can display the location information of the recording apparatus 10 on a map on a screen based on the received location information of the recording apparatus 10. Thus, the external apparatus 20 can identify the transition of the location information and the current location of the recording apparatus 10 taken away by the malicious party or the like by receiving the location information of the recording apparatus 10. As a result, the recording apparatus 10 can be found, and, for example, the police or the like can identify the party who has taken away the recording apparatus 10 and the vehicle of the party from the images of other monitoring cameras or dashboard cameras other vehicles have near the moving route of the party who has taken away the recording apparatus 10 using the transition of the location information of the recording apparatus 10.

Preferably, when the communication control unit 171 detects that the distance between the location information of the recording apparatus 10 at the time of detection of the removal by the removal detection unit 181 and the location information of the recording apparatus 10 after the removal is equal to or greater than the predetermined distance, the communication control unit 171 may transmit the location information of the recording apparatus 10 to the external apparatus 20. The predetermined distance referred to here is a distance that, for example, after an event such as an accident occurs, the recording apparatus 10 is taken away and clearly hinders the check of the event record data. For example, a distance of 1000 m or more is set as the predetermined distance. By doing so, when the owner of the recording apparatus 10 removes the recording apparatus 10 and reproduces the event record data near the accident site to show the data to other parties, the police, and the like, it is possible to prevent or minimize the location information of the recording apparatus 10 from being transmitted unnecessarily.

After the removal detection unit 181 detects the recording apparatus 10 being removed from the vehicle and the communication control unit 171 starts the transmission of the location information to the external apparatus 20, the communication control unit 171 can continue the transmission of the location information while the power supply capacity of an internal power supply 145 allows the transmission of the location information. Thus, the location information of the recording apparatus 10 taken by the malicious party can be transmitted for a possible period, thereby further increasing the possibility that the party who has taken away the recording apparatus or the vehicle of the parties can be identified.

Next, with reference to FIG. 1, each of the components connected to the control unit 100 will be described. The recording apparatus 10 may include an operation unit 140, a display unit 141, an acceleration sensor 142, a GNSS reception unit 143, a CAN I/F 144, a photographing unit 150, a recording unit 160, and a communication unit 170. The recording apparatus 10 may include an attachment/detachment sensor 922 provided in the attachment/detachment unit 921 and an internal power supply 145. The recording apparatus 10 is connected to the external power supply 30 through a wired cable.

The operation unit 140 is a user interface for receiving an operation performed by a user to the recording apparatus 10. The user interface may be, for example, an operation button, or a touch sensor disposed to be superimposed on the display unit 141. The user interface may be a reception unit for infrared or wireless communication, and may receive a signal transmitted from a remote controller or the like. The operation unit 140 supplies operation information, which is information related to the received operation, to the control unit 100 through a predetermined interface. The operation information is, for example, an instruction to start recording the event or an instruction to reproduce the event record data. In this example, the recording apparatus 10 includes the operation unit 140, but the present disclosure is not limited to this. If the operation unit 140 is a remote controller or the like, the operation unit 140 may be provided outside the recording apparatus 10 as a separate body. In this case, the recording apparatus 10 may include an operation signal reception unit for receiving an operation signal from the operation unit 140 such as a remote controller.

The display unit 141 is a display apparatus which displays various information under the control of the display control unit 126. The display unit 141 has at least a display panel such as a liquid crystal panel or an organic EL (Electro Luminescence). The display unit 141 is connected to the display control unit 126 and displays a signal supplied from the display control unit 126. The display unit 141 displays the images included in the event record data or the like reproduced by the reproduction control unit 124. In this example, the recording apparatus 10 includes the display unit 141, but the present disclosure is not limited to this. The display unit 141 may be provided as a separate body outside the recording apparatus 10.

The acceleration sensor 142 is, for example, a three-axis acceleration sensor, and is installed at any position of the recording apparatus 10. The acceleration sensor 142 detects the acceleration applied to the acceleration sensor 142, and supplies information about the detected acceleration to the control unit 100. The acceleration sensor 142 is connected to the acceleration information acquisition unit 127, and supplies the information about the detected acceleration to the acceleration information acquisition unit 127.

The GNSS reception unit 143 receives information which identifies the current location of the recording apparatus 10 by, for example, a satellite positioning system called GPS (Global Positioning System). The GNSS reception unit 143 includes an antenna for receiving a GNSS signal. The GNSS reception unit 143 may additionally include a communication interface for receiving the location information acquired by the vehicle. The GNSS reception unit 143 supplies the received signal related to the current location of the recording apparatus 10 to the location information acquisition unit 129.

The internal power supply 145 supplies power for operating the recording apparatus 10 when the supply of external power to the recording apparatus 10 is stopped. The internal power supply 145 is a rechargeable battery or a capacitor for storing power from the external power supply 30.

The photographing unit 150 is an imaging apparatus including an objective lens, an imaging element, an A-D (Analog-to-Digital) conversion element, and so on. The photographing unit 150 photographs images including sceneries around the vehicle and generates the photographing data, which is data of the photographed images. The photographing unit 150 supplies the generated photographing data to the photographing data acquisition unit 120. The photographing data is recorded in the recording unit 160 in association with the location information from the GNSS reception unit 143. In this example, the recording apparatus 10 includes the photographing unit 150, but the present disclosure is not limited to this. The photographing unit 150 may be provided as a separate body outside the recording apparatus 10. That is, the photographing data may be supplied directly to the photographing data acquisition unit 120 from the photographing unit 150 provided outside a main body of the recording apparatus 10.

The recording unit 160 is a recording apparatus for storing the photographing data supplied from the photographing unit 150. The recording unit 160 is, for example, a memory card including a flash memory, or a non-volatile recording apparatus such as an SSD (Solid State Drive) or an HDD (Hard Disc Drive). The recording unit 160 is connected to the recording control unit 123, receives predetermined data from the recording control unit 123, and records the received data. The recording unit 160 supplies an event file including the recorded event record data to the reproduction control unit 124 in response to an instruction from the reproduction control unit 124. The recording unit 160 may be attachable to and detachable from the recording apparatus or may not be detachable from the recording apparatus 10. In terms of the purport of the present disclosure, it is more preferable that the the recording unit 160 be not easily removable or not removable at all. That is, the recording unit 160 is preferably incorporated into a housing of the recording apparatus 10 (also referred to as a recording and reproduction apparatus with a built-in recording unit).

The communication unit 170 transmits the location information of the recording apparatus 10 to the external apparatus 20 by wireless communication via a wireless network based on an instruction from the communication control unit 171.

The communication unit 170 may also receive information about the acceleration detected by a vehicle acceleration sensor (not shown) installed in a vehicle in which the recording apparatus 10 is installed, and output the information to the acceleration information acquisition unit 127. The communication unit 170 may acquire information about the acceleration detected by the vehicle acceleration sensor through wireless communication, or may acquire the information about the acceleration detected by the vehicle acceleration sensor using, for example, a communication system such as CAN or Ethernet (registered trademark). Alternatively, the communication unit 170 may communicate with a car navigation system installed in the vehicle to acquire acceleration information from an acceleration sensor included in the car navigation system.

Figure 2:
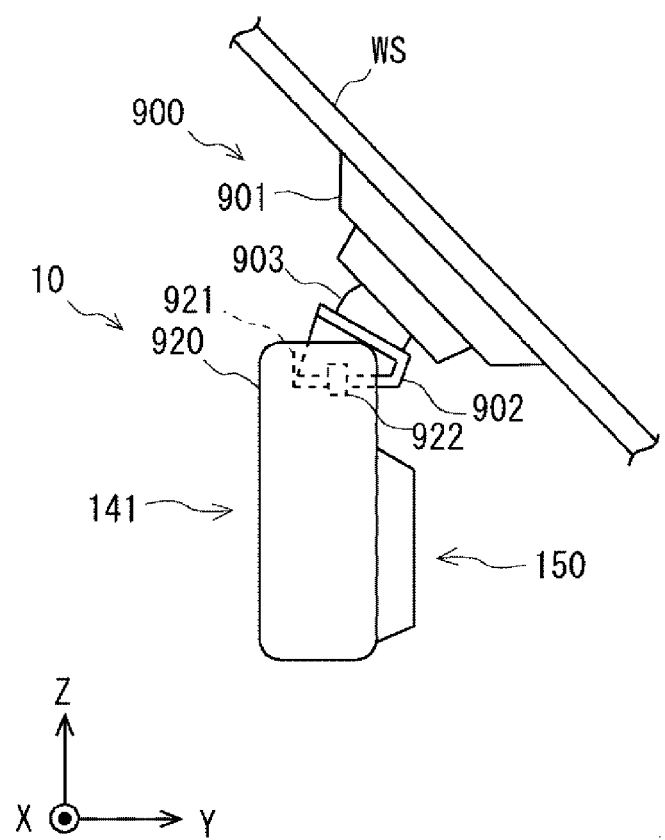
FIG. 2 is a right side view of the recording apparatus according to the first embodiment.
Figure 3:
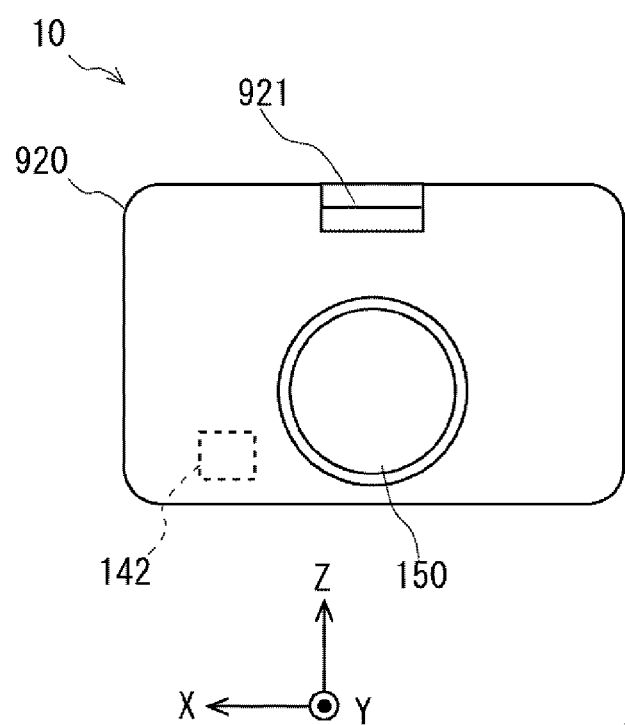
FIG. 3 is a rear view of the recording apparatus according to the first embodiment.
Figure 4:
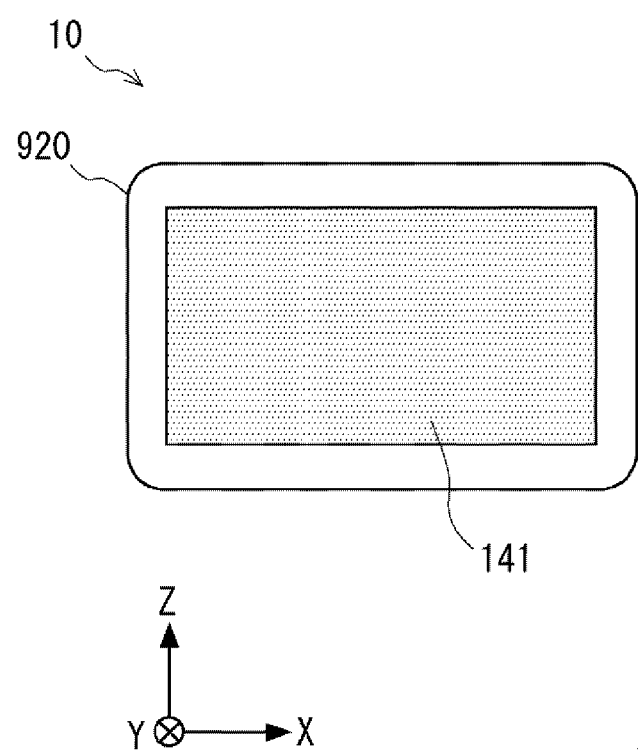
FIG. 4 is a front view of the recording apparatus according to the first embodiment.

Next, a mechanical configuration of the recording apparatus 10 will be described with reference to FIGS. 2 to 4. FIG. 2 is a right side view of the recording apparatus 10 according to the first embodiment. FIG. 3 is a rear view of the recording apparatus 10 according to the first embodiment as seen from a photographing direction. FIG. 4 is a front view of the recording apparatus 10 according to the first embodiment as seen from a display direction. In FIGS. 2 to 4, a right-handed orthogonal coordinate system is provided for convenience in explaining the positional relationship of the components. In the following drawings, when a orthogonal coordinate system is provided, the X-axis, Y-axis, and Z-axis directions of FIGS. 2 to 4 are equal to the X-axis, Y-axis, and Z-axis directions of the orthogonal coordinate system, respectively.

As shown in FIG. 2, the recording apparatus 10 is fixed to a windshield WS of the vehicle with a bracket 900 interposed therebetween. The bracket 900 includes an adhesive unit 901, a holding unit 902, and a ball joint 903.

The adhesive unit 901 is a member for attaching the recording apparatus 10 to a front surface of the vehicle in contact with the windshield WS using an adhesive, double-sided tape, or the like. The bracket 900 is fixed by fixing the adhesive unit 901 to any position of the windshield WS.

The holding unit 902 is attachable to and detachable from the attachment/detachment unit 921 and fits to the attachment/detachment unit 921 so that, while the vehicle is traveling, the recording apparatus does not come off, or a photographing direction deviation doesn't occur. For example, the holding unit 902 has ribs or grooves which are slidable and engageable with the attachment/detachment 921 in a predetermined direction. The recording apparatus 10 is locked and fixed by a locking mechanism (not shown) when the holding unit 902 slides onto a predetermined position in the attachment/detachment unit 921.

The attachment/detachment sensor 922 is provided between an attachment/detachment unit 921 and the holding unit 902 of the recording apparatus 10. The attachment/detachment sensor 922 can detect that the recording apparatus 10 is removed. When the recording apparatus 10 is removed from the holding unit 902 held by the vehicle, the attachment/detachment sensor 922 transmits a signal indicating the removal to the removal detection unit 181.

The ball joint 903 is a joint mechanism provided so that the angle between the adhesive unit 901 and the holding unit 902 can be adjusted, and moves when a predetermined external force is applied. In a state in which the adhesive unit 901 adheres to the windshield WS and the holding unit 902 is fitted to the recording apparatus 10, the ball joint 903 is configured not to move unless a predetermined external force is applied.

A user using the recording apparatus 10 fixes the adhesive unit the recording apparatus 10 to the holding unit 902. In this way, the recording apparatus 10 is fixed to the vehicle.

When the user removes the recording apparatus 10 fixed to the vehicle, the user releases the attachment/detachment unit 921 of the recording apparatus 10 from the holding unit 902. When the attachment/detachment unit 921 is released from the holding unit 902, the user releases a lock mechanism (not shown) and slides the attachment/detachment unit 921 away from the holding unit 902. In this way, the recording apparatus 10 is removed from the vehicle.

A periphery of the recording apparatus 10 is covered with a housing 920 made of resin. In the recording apparatus 10, the display panel included in the display unit 141 is disposed on a front face, an objective lens of the photographing unit 150 is exposed on a rear face, and attachment/detachment unit 921 is provided on an upper surface. Therefore, in the recording apparatus 10, the attachment/detachment unit 921 provided on the upper surface is fitted to the holding unit 902 of the bracket 900, the objective lens of the photographing unit 150 is exposed in a traveling direction of the vehicle, and the display panel of the display unit 141 is disposed to face the driver side. When the recording apparatus 10 is installed in this manner, the recording apparatus 10 photographs images in the traveling direction of the vehicle and displays the photographed images to the driver. The size of the display panel of the recording apparatus 10 is, for example, about 1.5 to 4 inches diagonally. The size of the housing 920 is, for example, about 5 cm to 10 cm in a width direction (X-axis direction).

As shown in FIG. 3, the recording apparatus 10 includes the acceleration sensor 142. Therefore, when the recording apparatus 10 is fixed to the vehicle by the bracket 900, the acceleration sensor 142 detects the acceleration received by the vehicle through the bracket 900. The acceleration sensor 142 detects the acceleration also when the user removes or attaches the recording apparatus 10 from or to the bracket 900, or when the user rocks or pushes the recording apparatus 10.

The bracket 900 described above is an example of mounting the recording apparatus 10 on a vehicle, and the recording apparatus 10 can be mounted on the vehicle or a mobile object in various preferable ways. Further, the sensor for detecting the removal is not limited to the attachment/detachment sensor 922 described above, but may be any preferable sensor provided between the recording apparatus 10 and the mobile object. Such a sensor for detecting the removal can detect that the recording apparatus 10 is removed from the mobile object.

Figure 5:
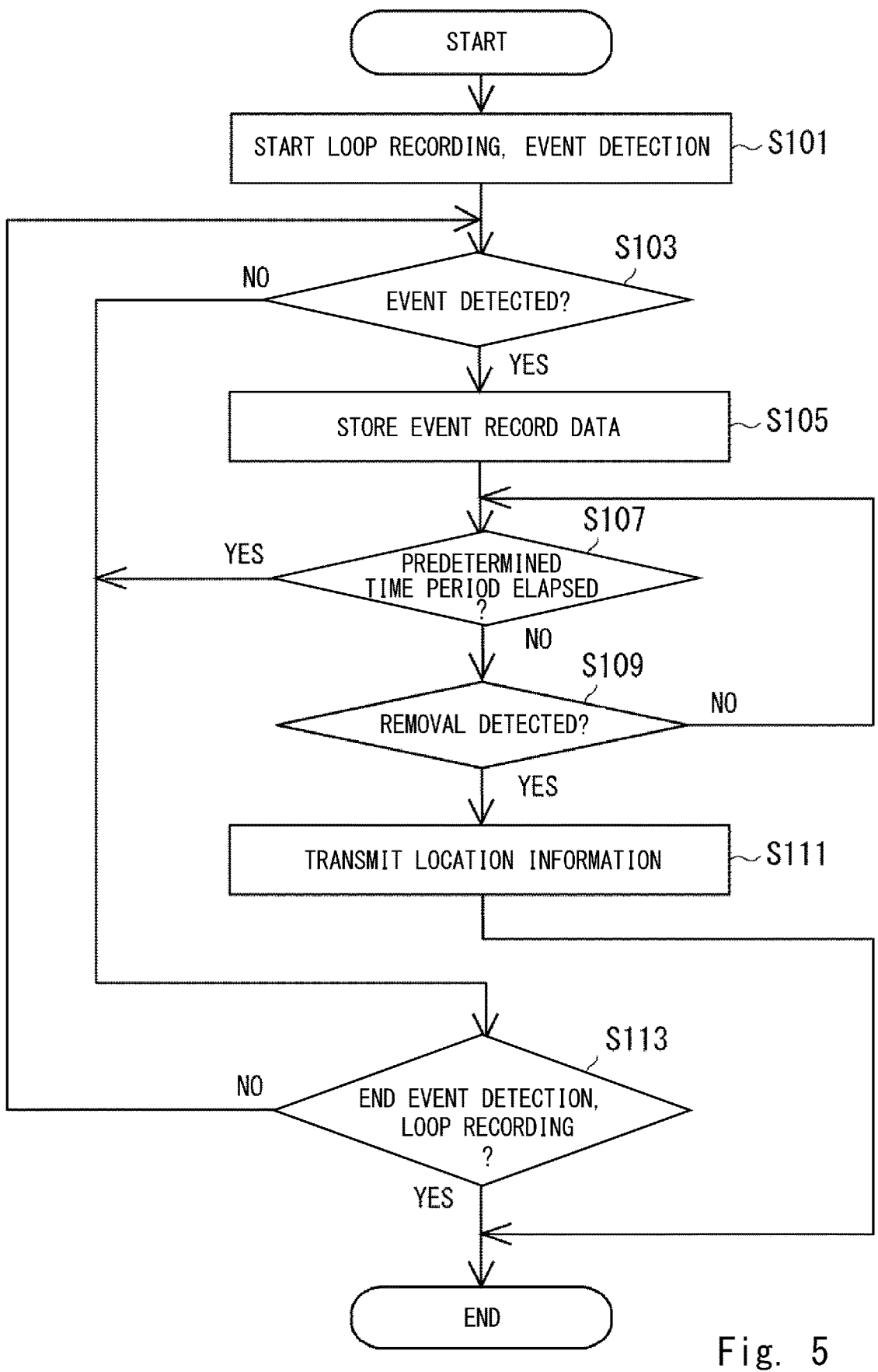
FIG. 5 is a flowchart showing an operation of the recording control apparatus according to the first embodiment.

The operation of the recording control apparatus according to the embodiment will be described with reference to the flowchart of FIG. 5.

The recording control apparatus 100 starts a loop recording operation for recording the photographing data in an overwritable manner and an event detection operation (Step S101). When the event detection unit 128 determines an occurrence of acceleration satisfying a condition to be detected as an event, such as a collision accident between a vehicle to which the recording apparatus 10 is attached and another vehicle (YES in Step S103), the recording control apparatus 100 stores the photographing data for a predetermined time period corresponding to the detected event in the recording unit 160 as the event record data (Step S105). The event record data is stored in a format in which overwriting or erasure is prohibited.

Next, after the event is detected, the recording control apparatus 100 determines whether or not a predetermined time period has elapsed since the event is detected (Step S107). This determination is made to determine whether or not the recording apparatus 10 is removed due to an event such as a collision (Step S109). This predetermined time period is, for example, a time period within which there is a possibility that another party may take the recording apparatus 10 away from the site where the event occurs after the occurrence of the event, and a time period within which, after the predetermined time since the removal of the recording apparatus has elapsed, it can be determined that the removal is not directly related to the event. The predetermined time period is set, for example, from 5 minutes to 10 minutes.

Next, the removal detection unit 181 of the recording control apparatus 100 acquires a signal indicating that the recording apparatus is removed from the vehicle (e.g., a signal indicating that the external power supply is disconnected, a signal from the attachment/detachment sensor 922, a signal indicating that the recording apparatus 10 and the vehicle are separated from each other by the predetermined distance (the first predetermined distance), etc.), and determines whether or not the recording apparatus 10 is removed from the vehicle (Step S109). That is, before the elapse of the predetermined time period (NO in Step S107), when the removal detection unit 181 detects that the recording apparatus 10 is removed from the vehicle (YES in Step S109), it is presumed that another party of the event such as a collision has taken away the recording apparatus and the communication control unit 171 starts transmitting the location information of the recording apparatus 10 to a preset external apparatus (e.g., the mobile phone of the owner of the recording apparatus 10) (Step S111). In this manner, by using the external apparatus, the owner can identify the location of the main body of the recording apparatus 10 which has been taken away maliciously by the other party, and can identify an escape route of the other party. If it is determined in Step S109 that the removal is not detected (NO in Step S109), the processing transitions to Step S107. In Step S111, after the transmission of the location information of the recording apparatus 10 to the external apparatus is started, the transmission of the location information is continued as long as possible, and the processing is ended. In this case, there is a high possibility that an internal power supply capacity of the recording apparatus 10 is exhausted or the recording apparatus 10 is destroyed or disposed of.

On the other hand, when the predetermined time period has elapsed (YES in Step S107), the recording apparatus 10 is kept attached to the mobile object, or the recording apparatus 10 is removed after the predetermined time period has elapsed. In either case, there is no indication that the other party who is a party of the event has taken away the recording apparatus 10, so it is determined whether or not event detection processing and the loop recording operation should be ended (Step S113). If the event detection processing and the loop recording operation are not ended (NO in Step S113), the processing in Step S103 is repeated.

Second Embodiment

Figure 6:
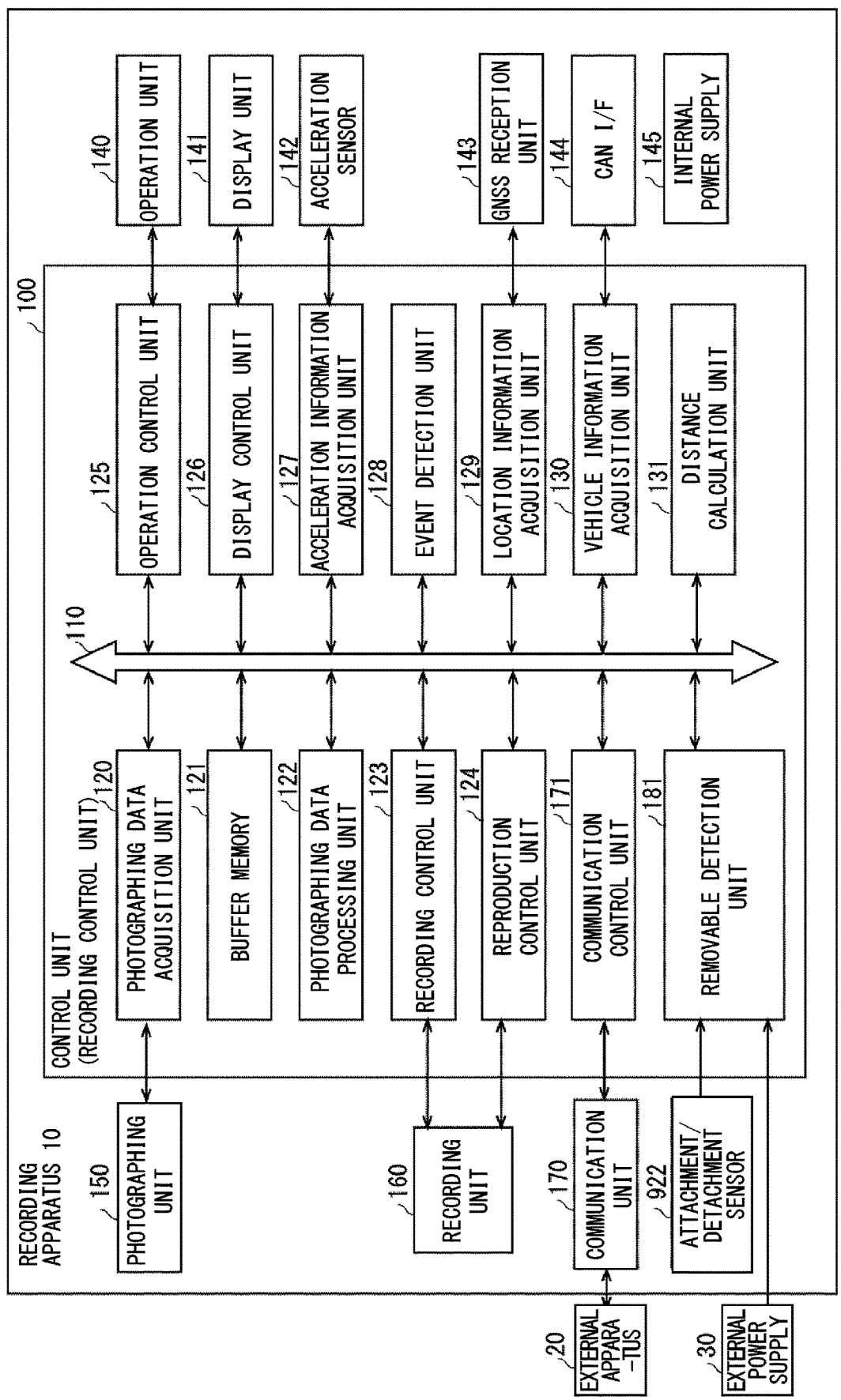
FIG. 6 is a block diagram showing a configuration of a recording apparatus according to a second embodiment.

FIG. 6 is a block diagram showing a configuration of a recording apparatus 10 including a control unit 100 according to the second embodiment. In FIG. 6, the same components as those in the first embodiment are denoted by the same reference numerals as those in FIG. 1, and description thereof will be omitted as appropriate.

The control unit 100 according to this embodiment will be described in detail below with reference to FIG. 6. The control unit 100 according to this embodiment is different from the control unit 100 according to the first embodiment shown in FIG. 1 in that the control unit 100 according to this embodiment further includes a distance calculation unit 131.

The distance calculation unit 131 calculates a distance between the vehicle and the recording apparatus 10. This calculation can be performed based on the location information of the vehicle acquired as the vehicle information from the vehicle information acquisition unit 130 and the location information of the recording apparatus 10.

The distance calculation unit 131 can calculate the distance between the vehicle and the recording apparatus 10 based on the location information of the vehicle when the vehicle stops after the event detection unit 128 detects the event and the location information of the recording apparatus 10.

Figure 7:
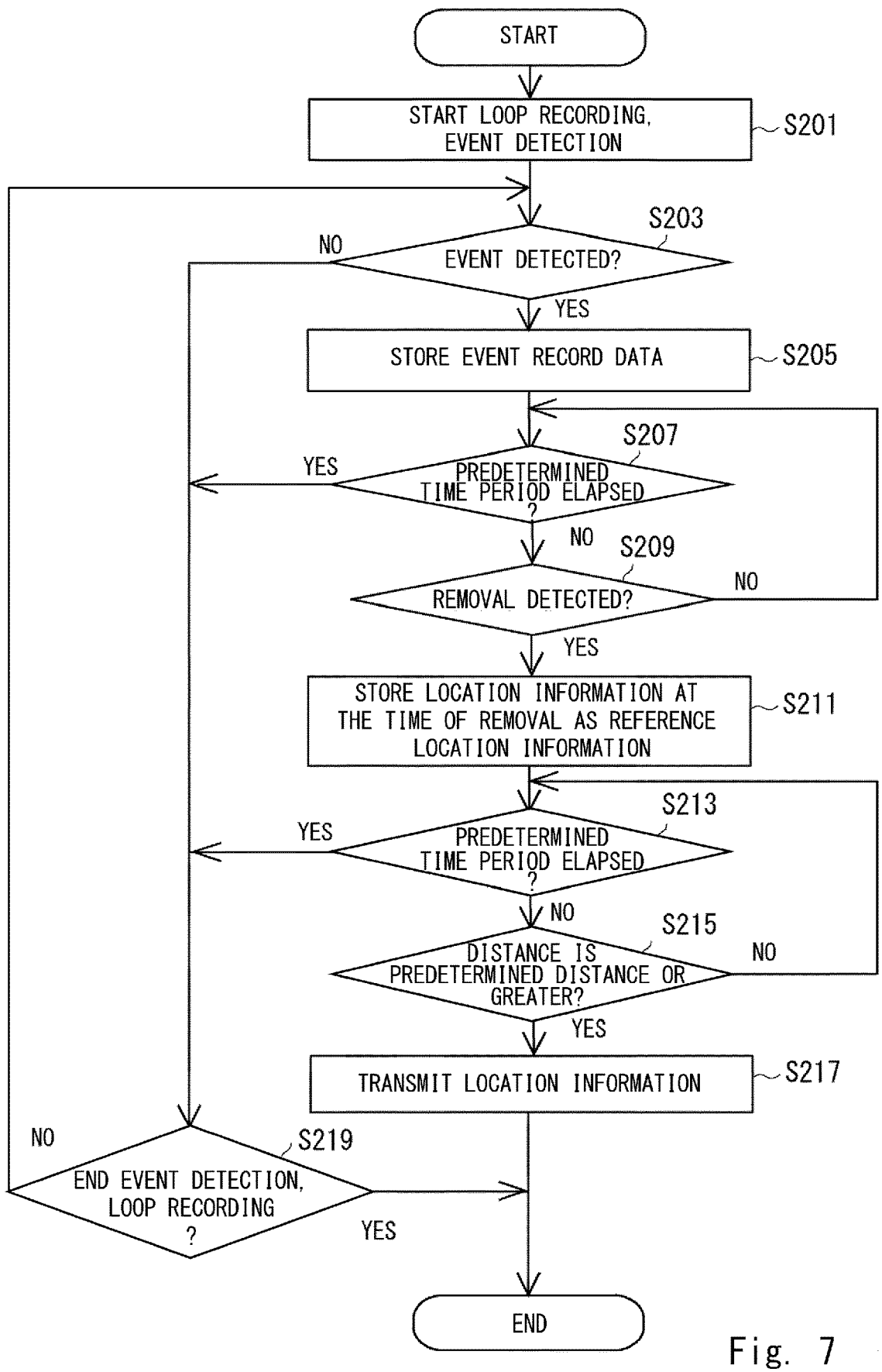
FIG. 7 is a flowchart showing an operation of a recording control apparatus according to the second embodiment.

The operation of the recording control apparatus according to this embodiment will be described with reference to the flowchart of FIG. 7. Steps S201 to S209 in the flowchart of FIG. 7 are the same as steps S101 to S109, respectively, in the flowchart of FIG. 5, and Steps S213 and S217 to S209 are the same as steps S109 and S111 to S113, respectively, in the flowchart of FIG. 5, and therefore the description thereof is omitted. If it is detected in Step S209 that the recording apparatus 10 is removed (YES in Step S209), the location information acquisition unit 129 first stores the location information at the time of the removal of the recording apparatus 10 as reference location information (Step S211).

Next, it is determined whether a predetermined time period has elapsed from the time of the removal (Step S213). In this case, the predetermined time period is set such that a malicious party has taken away the recording apparatus 10 and runs away to a distance so that the check of the event record data is clearly hindered. The predetermined time period is, for example, three minutes. If it is determined in Step S213 that the predetermined time period has not elapsed (NO in Step S213), it is determined whether or not the distance between the location information of the recording apparatus 10 when the removal is detected by the removal detection unit 181 and the location information of the recording apparatus 10 after the removal is greater than a predetermined distance (Step S215). If it is determined in Step S215 that the distance is not equal to or greater than the predetermined distance (NO in Step S215), the processing returns to Step S213, while if it is detected in Step S215 that the distance is equal to or greater than the predetermined distance (YES in Step S215), the processing transitions to Step S217. A second predetermined distance as the predetermined distance determined in Step S215 is set such that, for example, after the recording apparatus is removed, the recording apparatus 10 has been taken away by another party, so that the check of the event record data is clearly hindered. The second distance is, for example, 1000 m. In the second embodiment, in addition to the effect of the first embodiment, it can be more appropriately determined that the recording apparatus 10 is taken away.

According to the various embodiments, the external apparatus that has received the location information of the recording apparatus can refer to the location information of the recording apparatus that has been taken away. Therefore, the police or the like can identify the party of the accident based on the images and the like of any security camera in the vicinity of the escape route in accordance with the location information of the recording apparatus. Even if the stolen dashboard camera is destroyed or abandoned on the way to escape, the party of the accident can be identified if there is a security camera on the escape route from the accident site to the location where the driver recorder is destroyed or abandoned. Further, eyewitness information can also be acquired.

Further, as described above with reference to the various embodiments, the present disclosure can also take the form of a recording control method, as described above with reference to the procedure of processing in the recording control apparatus. The recording control method includes the following steps. A step of acquiring photographing data photographed by a photographing unit; detecting an event of a mobile object; storing the photographing data for a predetermined time period corresponding to the detected event as event record data in a recording unit; detecting that a recording apparatus is removed from the mobile object by acquiring a signal indicating that the recording apparatus including at least the recording unit is removed from the mobile object; acquiring location information of the recording apparatus; and transmitting the acquired location information to another apparatus when the removal of the recording apparatus is detected within a predetermined time period after the event is detected. Other examples are as described in the various embodiments described above. Furthermore, a recording control program is a program for causing a computer to execute such a recording control method.

In the above embodiments, each element described in the drawing as a functional block for performing various processes can be constituted by a CPU, a memory, and other circuits in terms of hardware, and can be implemented by a program loaded in a memory or the like in terms of software. Accordingly, it is understood by those skilled in the art that these functional blocks may be implemented in a variety of ways by hardware only, software only, or combinations thereof, and is not limited to either.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W, (CD-ReWritable) and semiconductor memories (such as Mask ROM, PROM (Programmable ROM), EPROM (Erasable PROM), flash ROM, RAM (Random Access Memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

What is claimed is:

1. A recording control apparatus, which controls a recording apparatus, the recording control apparatus comprising:
a photographing data acquisition unit configured to acquire photographing data photographed by a photographing unit;
an event detection unit configured to detect an event of a mobile object;
a recording control unit configured to store the photographing data for a predetermined time period corresponding to the event detected by the event detection unit as event record data in a recording unit;
a removal detection unit configured to detect that the recording apparatus is removed from the mobile object by acquiring a signal indicating that the recording apparatus including at least the recording unit is removed from the mobile object;
a location information acquisition unit configured to acquire location information of the recording apparatus; and
a communication control unit configured to transmit the location information acquired by the location information acquisition unit to another apparatus when the removal of the recording apparatus is detected by the removal detection unit within a predetermined time period after the event detection unit detects the event.

2. The recording control apparatus according to claim 1, wherein, when the communication control unit detects that a distance between the location information when the removal is detected by the removal detection unit and the location information after the removal is equal to or greater than a predetermined distance, the communication control unit is configured to transmit the location information of the removed recording apparatus to the other apparatus.

3. The recording control apparatus according to claim 1, wherein, when the removal detection unit detects that the recording apparatus is removed from the mobile object, the communication control unit is configured to continue to transmit the location information to the other apparatus from the time of the removal.

4. The recording control apparatus according to claim 1, wherein
the removal detection unit is configured to detect that the recording apparatus is removed from the mobile object by acquiring a signal indicating that an external power supply supplied to the recording apparatus is disconnected.

5. The recording control apparatus according to claim 1, wherein
the removal detection unit is configured to detect that the recording apparatus is removed from the mobile object by acquiring a signal from a sensor provided between the recording apparatus and the mobile object.

6. A recording apparatus comprising:
the recording control apparatus according to claim 1;
the photographing unit;
a display unit configured to display the photographing data photographed by the photographing unit;
the recording unit;
a Global Navigation Satellite System (GNSS) reception unit configured to output a GNSS reception signal to the location information acquisition unit; and
an internal power supply configured to supply power to the recording apparatus.

7. A recording control method comprising:
acquiring photographing data photographed by a photographing unit;
detecting an event of a mobile object;
storing the photographing data for a predetermined time period corresponding to the detected event as event record data in a recording unit;
detecting that a recording apparatus is removed from the mobile object by acquiring a signal indicating that the recording apparatus including at least the recording unit is removed from the mobile object;
acquiring location information of the recording apparatus; and
transmitting the acquired location information to another apparatus when the removal of the recording apparatus is detected within a predetermined time period after the event is detected.

8. A non-transitory computer readable medium storing a recording control program for causing a computer to execute processing of:
acquiring photographing data photographed by a photographing unit;
detecting an event of a mobile object;
storing the photographing data for a predetermined time period corresponding to the detected event as event record data in a recording unit;
detecting that a recording apparatus 1 s removed from the mobile object by acquiring a signal indicating that the recording apparatus including at least the recording unit is removed from the mobile object;
acquiring location information of the recording apparatus; and
transmitting the acquired location information to another apparatus when the removal of the recording apparatus is detected within a predetermined time period after the event is detected.

* * * * *